United States Patent [19]

Polansky

[11] Patent Number: 5,232,721
[45] Date of Patent: Aug. 3, 1993

[54] DEEP FRIED FOODSTUFFS RETAINING A MINIMUM AMOUNT OF FRYING MEDIUM AND A METHOD FOR THEIR PREPARATION

[76] Inventor: Seymour Polansky, 72 Florence Rd., Riverside, Conn. 06878

[21] Appl. No.: 767,830

[22] Filed: Sep. 30, 1991

[51] Int. Cl.$^5$ ................................................. A23P 1/08
[52] U.S. Cl. ...................... 426/94; 426/291; 426/297; 426/302; 426/438; 426/102
[58] Field of Search ............... 426/92, 94, 95, 302, 426/291, 297, 438, 102

[56] References Cited

U.S. PATENT DOCUMENTS

| | | | |
|---|---|---|---|
| 3,676,158 | 7/1972 | Fischer | 426/94 |
| 3,865,962 | 2/1975 | Earle | 426/291 |
| 4,511,583 | 4/1985 | Olson | 426/302 |
| 4,585,660 | 4/1986 | Sugisawa | 426/438 |
| 4,769,248 | 9/1988 | Wilkins | 426/291 |
| 4,900,573 | 2/1990 | Meyers | 426/438 |
| 4,900,573 | 2/1990 | Meyers | 426/302 |
| 4,913,918 | 4/1990 | Stypula | 426/92 |
| 4,917,909 | 4/1990 | Prosise | 426/302 |
| 5,019,406 | 5/1991 | Ang | 426/302 |
| 5,057,329 | 10/1991 | Stypula | 426/92 |
| 5,126,152 | 6/1992 | Feeney | 426/302 |

Primary Examiner—Carolyn Paden

[57] ABSTRACT

Deep Fried Foodstuffs retaining a minimum amount of frying medium and a method for their preparation The improvement in the method that makes the minimization of oil retention possible comprises coating said foodstuffs with natural edible harmless barrier coatings directly or after a pretreatment. Water is eliminated from said foodstuff in this added step by heat, microwaves, vacuum or combinations thereof.

15 Claims, No Drawings

DEEP FRIED FOODSTUFFS RETAINING A MINIMUM AMOUNT OF FRYING MEDIUM AND A METHOD FOR THEIR PREPARATION

BACKGROUND OF THE INVENTION

1. Field of the Invention

This invention relates to deep fried foodstuffs retaining a minimum amount of the frying medium used in their preparation and an improved method for preparing said deep fried foodstuffs.

2. Description of the Related Arts

When foodstuffs are deep fried at high temperatures the water of the foodstuff is explosively vaporized creating voids in the foodstuff particularly at the periphery. The frying medium fills in these voids during the frying period. This results in a product with a large amount of materials deemed very bad from a nutritional viewpoint (high caloric, arteriosclerotic, and carcinogenic content). It is also costly in terms of fat and oil usage. The energy used to remove the water vaporized lowers the frying temperature thereby necessitating longer frying times. This increases the fuel costs and works against careful temperature control. Furthermore the frothing and foaming associated with this loss of water increases frying oil medium losses, and the attendant increase in cost. It also fills the ambient room air with oil containing the carcinogens produced by the high temperatures used in frying. Coatings on food are not new. Fried foods are traditionally coated with a batter or are breaded. Either of these coatings unfortunately suffers from all of the disadvantages of traditional frying processes.

Prosine in U.S. Pat. No. 4,917,908 describes the use of the synthetic polymer polyvinylpyrollidone as a coating to minimize oil uptake in deep frying. This is very interesting and potentially very useful as taught in the patent. However, there is always the question of unforeseen hazards to health when dealing with a synthetic polymer.

Gold in U.S. Pat. No. 3,424,591 describes a process using a thin coating of methyl cellulose. Unfortunately, this retains an excess of water in the fried product, making it soggy.

Morley in U.S. Pat. No. 4,565,702 describes the use of soluble coatings of biologically derived materials to mask the flavor of insoluble dietary fibers derived from cereal brans. He does not claim the use of these to reduce the fat and oil content of deep fried foodstuffs.

Nonaka et al in U.S. Pat. No. 3,846,572 disclose an environmentally unacceptable process involving the use of a dichlorodifluoro hydrocarbon freeze followed by a water leach prior to deep frying.

Olsen et al in U.S. Pat. No. 4,511,583 describe a process for preparing battered and breaded foodstuffs using either starch or gelatin films to prevent oil absorption.

Lee et al in U.S. Pat. No. 4,721,625 provide a process for preparing potato chips involving partially frying the chips in hot oil. A substantial amount of residual oil is removed in an oxygen free atmosphere using steam followed by a treating with superheated steam. Obviously an initial partial frying is working against the purpose of minimizing oil retention. The use of superheated steam would entail considerable expenditure of time and energy. The capital and operating expenses would be equally burdensome.

My invention does not offer solutions to each individual problem associated with the attempts made by the earlier inventions to minimize undesirable oil uptake in deep frying that are compatible with desirable organoleptic properties. It does address many of the objections and furthermore allows for a wide variety of organoleptic properties attached to the deep fried foodstuff because of the nature of my method. By varying the conditions used in the pretreatment used in one of the embodiments of this invention the product's organoleptic property can be varied. Totally crunchy to crunchy on the outside/soft in the inside can be produced depending upon the amount of water removed in said pretreatment.

1. I teach the removal of water in a first step without the use of environmentally unsound chemicals that Nonanka et al suggest. Dry cooking in a conventional oven, cooking in a microwave oven, by vacuum, by freeze drying and combinations of these can be used.

2. My use of natural polymers with or without a first water removing step is obviously preferable to the synthetic ones suggested by Prosine. It is difficult to predict unknown and harmful harmful effects associated with synthetic synthetic polymers.

3. The dry pretreatments of my invention overcomes the objections to Gold cited by Prosine, regarding the retention of too much water whereby the core of the fried foodstuff is soggy. My process, particularly the embodiment which incorporates a first step which removes water prior to coating does two things. It prevents the voids, into which the frying medium enters thus minimizing the fat content of the product. It also gives the preparer options as to core water content, frying time and temperature depending on how much water is removed in the first step. It is permits the preparation of a foodstuffs exhibiting a wide variety of organoleptic properties. These operational parameters make it possible to minimize frying time, and temperature hence costs.

4. My invention does not require two additional treatments with steam and superheated steam respective to get rid of oil as taught by Lee et al.

SUMMARY

The object of this invention is to produce an organleptically acceptable deep fried foodstuff and an improved method for preparing said deep fried foodstuff. The above and other objects and features of the invention will be made apparent from the following descriptions of the invention.

The food stuffs that can be fried (batter covered, breaded or as is) include potatoes, fish, meat, onions, cheese, legumes, and combination foods such as dumplings, patties etc.

Fried foods make up a significant proportion of the nutritional intake of the American public, if not the world community. Since it has been highly recommended by health authorities to cut down on overall fat intake, my invention has much to offer. It will also make palatable and possibly even very desirable other "vegetarian" foods which have also been recommended by health and nutritional authorities. Thus a further object of this invention is a way to cut back on the incidence of several health problems: arteriosclerotic, heart disease, cancer of the intestinal tract among others.

It also will cut back on the cost of frying said foods. Less of the frying medium will be picked up during frying than is picked up during conventional frying processes. Finally it will reduce the dangers of fire due to oil and smoke spattered in the frying area as water is expelled explosively from the foodstuff.

SUMMARY

My invention teaches an improved method for preparing foodstuffs having significantly less frying medium retained than conventional deep fried foods. It comprises a layer of an edible water swellable naturally occurring polymer chosen from the group consisting of proteins, modified proteins, carbohydrates, and modified carbohydrates. The proteins comprise: collagen, gelatine and casein. The carbohydrates include algin (also known as aliginates) the so called water soluble complex carbohydrates found in oat bran. The modified proteins include gelatine, the modified carbohydrates include carboxymethylcellulose and methylcellulose over a core of said foodstuff. It is prepared by coating said foodstuff by direct application to said foodstuff of said polymer. In a second embodiment said polymer is applied after a preliminary dry treatment in which water is removed from the foodstuff. Either of these methods reduce the frying medium uptake during deep frying. The methods available are thermal baking, microwave cooking, application of vacuum, freeze drying and the combination of vacuum with either said baking or said microwaving.

DESCRIPTION OF THE PREFERRED EMBODIMENTS

In accordance with the invention, peeled raw potatoes were fcut into slices 6 centimeters in length with the following dimensions: 1.2×1.2×6 centimeters. The dispersions of collagen used were prepared by soaking strips of pork belly in vinegar, dicing them and then dispersing the pieces in water using a Waring type blender. The dispersion was diluted to the desired concentration. The collagen was applied by dipping in the appropriate collagen dispersion (1-2%) for between 30 seconds to 30 minutes depending on the factor being evaluated in the individual experiments. All samples were deep fried in corn oil. The time and temperature depended upon the particular parameter being investigated, varying between 300 degrees to 400 degrees Fahrenheit for between 1 minute to 5 minutes. The cut up pieces of potato after frying were drained for approximately two minutes to remove the adhering oil. To insure complete removal of the surface oil, the fried slices were then blotted dry with paper toweling to prepare the fried samples for oil retention analysis. They were then dried by warm air, and then pulverized by mortar an pestle. The ground samples were analyzed for oil content in a Soxhlet Extractor. The experiments described followed the above experimental pattern.

The results presented in table 1 represent an average of 25 experiments covering a variety of random experimental conditions (the concentration of the collagen dispersion used, the time the potatoes were immersed in the collagen dispersion, frying temperature and frying time). As is readily seen in TABLE 1, dry pretreatments which remove water (microwaving for example) reduces the oil in the fried potatoes about 50%.

TABLE 1

| PRETREATMENT | COATING | % OIL in FRIES |
| --- | --- | --- |
| none | none | 12 |
| none | yes | 10 |
| boiled for 4' | yes | 12 |

TABLE 1-continued

| PRETREATMENT | COATING | % OIL in FRIES |
| --- | --- | --- |
| microwaved 4' | yes | 7 |

EXAMPLE 1

The potato slices were deep fried without any further treatment and used as controls. The average oil retained in 8 tries was 12%.

EXAMPLE 2

The potato slices were immersed in dilute collagen solutions (2%) for 30 seconds to 30 minutes, and then dried using a home air dry blower. The slices were fried in corn oil at 350 to 400 degrees Fahrenheit for 3 to 4 minutes. The average amount of oil retained in 5 tries was 10%.

EXAMPLE 3

The potato slices were cooked in a microwave oven for 4 minutes. During this cooking operation, the strips were rotated every minute so that all sides contacted the plate for one minute and the ambient air for three minutes. This assured a uniform treatment throughout the individual strip and between strips. The strips were immersed in dilute collagen solutions (about 2% for 30 seconds to 30 minutes, and then dried using a home air blow drier. The strips were fried in corn oil at 350 to 400 degrees Fahrenheit for 3 to 4 minutes. The average oil retained in 12 tries was 7%.

EXAMPLE 4

The potato slices were cooked in boiling water for 4 minutes. The strips were immersed in dilute collagen solutions (2) for 30 seconds to 30 minutes, and then dried using a home air blow drier. The strips were fried in corn oil at 350 to 400 degrees Fahrenheit for 3 to 4 minutes. The average oil retained in 6 tries was 12%.

It was observed in all of the above and subsequent experiments that the coatings diminished the explosive vaporization of the water in the potatoes. However, the use of a coating with a prior dry treatment almost completely eliminated the frothing, steaming and general ebullition. All of which is to the good. It made temperature control of the frying operation much easier, and allowed the work area to be kept clean more easily.

EXAMPLE 5

The potato slices were dipped in dilute collagen (solids less than 1%) and removed at a uniform rate. A second sample was treated similarly. The collagen dispersion was over 2%.

TABLE 2

| collagen concentration | oil retained |
| --- | --- |
| 1% | 7.9% |
| 2% | 6.6% |

EXAMPLE 6

Using the above techniques one set of slices were fried directly. A second set was fried after being dipped in a 2% dispersion of collagen and held therein for 30 minutes containing over 2% solids was air dried and then fried.

TABLE 3

| Pretreatment | Oil Retention |
| --- | --- |
| none | 18% |
| 2% collagen | 10% |

The ebullition and frothing observed is quite apparent. The amount observed is diminished appreciably by the coating.

In summary:
1. Coating decreased the uptake of oil during frying.
2. The heavier the coat the lower the uptake.
3. A dry pretreatment had an almost synergistic lowering of oil uptake and most significantly reduced frothing, and ebullition etc.
4. A dry pretreatment allowed the potatoes to be completely fried more quickly at lower temperatures. Using the maximum dry pretreat time and the maximum fry time produced a product crunch throughout. Variations of time of pretreat and fry time produced fries of varying textures, including more or less conventional textures. In all cases the coatings were respectably crunchy.

EXAMPLE 7

Place the potato slices in a vacuum tight container for 1-10 minutes, the pressure maintained between 200 to 700 Torr. Immerse the vacuum treated strips in dilute collagen solutions (about 2%) for 30 seconds to 30 minutes, Dry, using a home air dry blower. Fry in oil at 350 to 400 degrees Fahrenheit for 3 to 4 minutes. Evaluate the oil retention as described previously. The average of 5 tries should be about 5-8%.

EXAMPLE 8

Precook the potato slices under dry conditions for 4 minutes in a thermal oven. Place in a vacuum tight container for 1 to 10 minutes the pressure being maintained between 200 to 700 Torr. Immerse the vacuum treated strips in dilute collagen solutions (from 1% to 2%) for 30 seconds to 30 minutes. The average oil retention after evaluation as described previously should be about 5-8%.

EXAMPLE 9

Precook the potato slices under dry conditions for 4 minutes in a microwave oven. Place in a vacuum tight container for 1-10 minutes, the pressure maintained between 200 to 700 Torr. Immerse the vacuum treated strips in dilute collagen solutions (1% to 2%) for 30 seconds to 30 minutes, Dry, using a home air blow drier. Fry in corn oil at 350 to 400 degrees Fahrenheit for 3 to 4 minutes. Analyze the fried potatoes for oil content as described previously. The average oil retention should be about 5-8%.

EXAMPLE 10

Freeze dry the potato slices and then immerse the strips in dilute collagen solutions (1% to 2%) for 30 seconds to 30 minutes, Dry, using a home air blow drier. Fry in oil at 350 to 400 degrees Fahrenheit for 3 to 4 minutes. Analyze the ground fried potatoes for oil content using the previously described method. The average oil retention should be about 5-8%.

Although the invention has been described with reference to certain embodiments thereof, it will be understood that it is not bound thereto and modifications may be made which are within the skill of the art and science. Accordingly, it is intended to be bound by the appended claims only in which:

applying at least one time, in a period taking at least 30 seconds, to said foodstuff an aqueous dispersion containing at least 0.1% of a water swellable, edible and completely harmless polymer of natural origin to said foodstuff,

I claim:

1. An improved method for frying foodstuffs which will minimize the uptake of the frying medium, said improvement comprising prior to frying the steps of:
    a. removing water from said foodstuff, by cooking, whereby voids are created,
    b. applying at least one coating of a swollen dispersion containing at least 0.1% of a naturally occurring perfectly harmless edible polymer chosen from the group consisting of proteins, modified proteins, carbohydrates and modified carbohydrates, whereby said voids are filled and covered,
    c. drying said coating of said edible polymer dispersion whereby it forms a continuous coating that functions as a barrier that minimizes the uptake of said frying medium,
    d. frying said coated foodstuff in said frying means.

2. A fried foodstuff containing a minimum amount of frying medium, said fried foodstuff, comprising:
    a. a core of said foodstuff having water previously removed by vaporization during cooking
    b. a continuous barrier coating of collagen.

3. A fried foodstuff containing a minimum amount of frying medium said fried foodstuff comprising:
    a. a core of said foodstuff having water previously removed by vaporization during cooking,
    b. a continuous barrier coating of casein.

4. A fried foodstuff containing a minimum amount of frying medium as recited in claims 2 or 3 wherein said dry cooking is carried out in a thermal oven.

5. A fried foodstuff containing a minimum amount of frying medium as recited in claims 2 or 3 wherein said dry cooking is carried out in a microwave oven.

6. A fried foodstuff containing a minimum amount of frying medium said fried foodstuff comprising:
    a. a core of said foodstuff having water previously removed by vaporization during cooking,
    b. a continuous barrier coating of a water soluble carbohydrate derived from oat bran.

7. A method for preparing fried foodstuffs containing a minimum amount of frying medium comprising the steps of:
    a. removing water from said foodstuff by vaporization during dry cooking followed by;
    b. applying a continuous wet coating of a dispersion containing at least 0.1% by weight of a water insoluble, swellable, edible polymer chosen from the group consisting of collagen, algin, and the soluble oat bran polysaccharide, followed by;
    c. drying said polymer coating whereby a continuous dry barrier coating is formed over said foodstuff, followed by;
    d. frying said coated foodstuff.

8. A method for preparing fried foodstuffs containing a minimum amount of frying as recited in claim 7 wherein the step of removing water by vaporization during cooking comprises cooking in a thermal oven.

9. A method for preparing fried foodstuffs containing a minimum amount of frying as recited in claim 7 wherein said step of removing water by vaporization during cooking comprises cooking in a microwave oven.

10. A method for preparing fried foodstuffs containing a minimum amount of frying as recited in claim 7 wherein said step of removing water by vaporization during cooking comprises cooking in a thermal oven under vacuum.

11. A method for preparing fried foodstuffs containing a minimum amount of frying as recited in claim 7 wherein the step of removing water by vaporization during cooking comprises cooking in a microwave oven under vacuum.

12. A method for preparing fried foodstuffs as recited in claim 7 containing a minimum amount of frying medium wherein said swellable edible polymer is collagen.

13. A method for preparing fried foodstuffs as recited in claim 7 containing a minimum amount of frying medium wherein said swellable, edible polymer is a water soluble oat bran polysaccharide.

14. A method for preparing fried foodstuffs as recited in claim 7 containing a minimum amount of frying medium wherein said swellable edible polymer is algin.

15. A method for preparing fried foodstuffs containing a minimum amount of frying medium comprising the steps of:
  a. removing water from said foodstuff by vaporization during dry cooking followed by;
  b. applying a continuous wet coating of a dispersion of gelatin followed by;
  c. drying said polymer coating whereby a continuous barrier coating is formed over said foodstuff, followed by;
  d. frying said coated foodstuff.

* * * * *